Aug. 18, 1970     E. L. VOEKS ET AL     3,524,512
SELF-PROPELLED DRIVING AND STEERING TRUCK FOR SHOPPING CARTS
Filed Feb. 21, 1968                           2 Sheets-Sheet 1

Elton L. Voeks
Arwed J. Barnowsky
INVENTORS

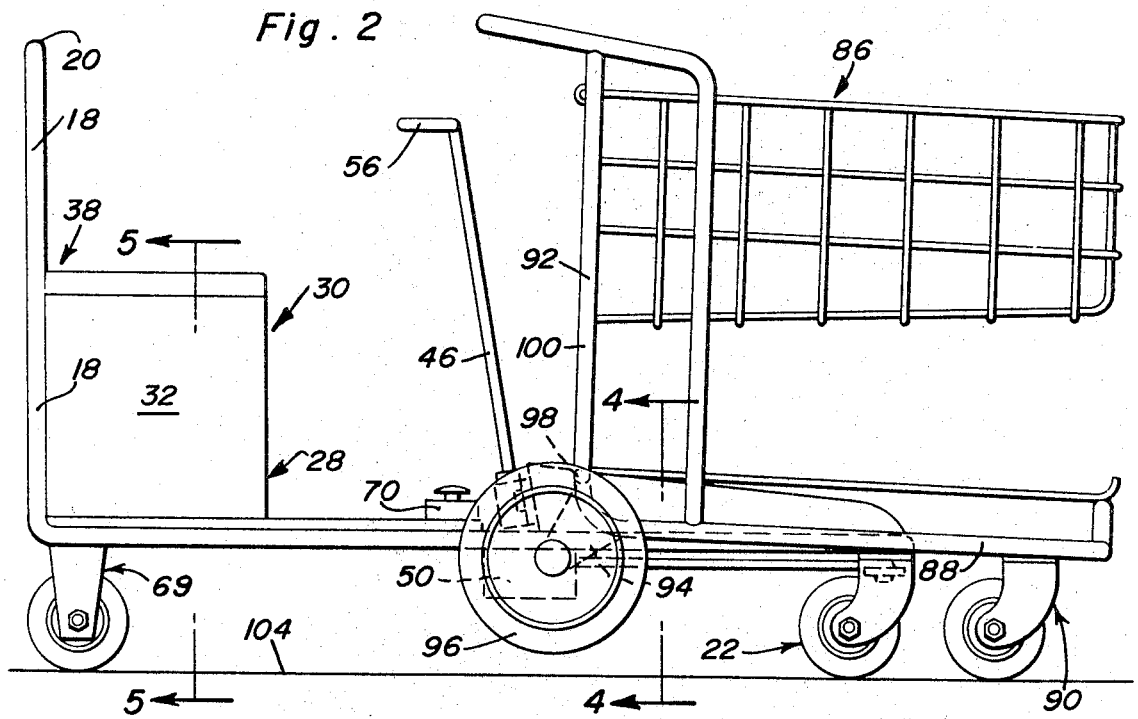
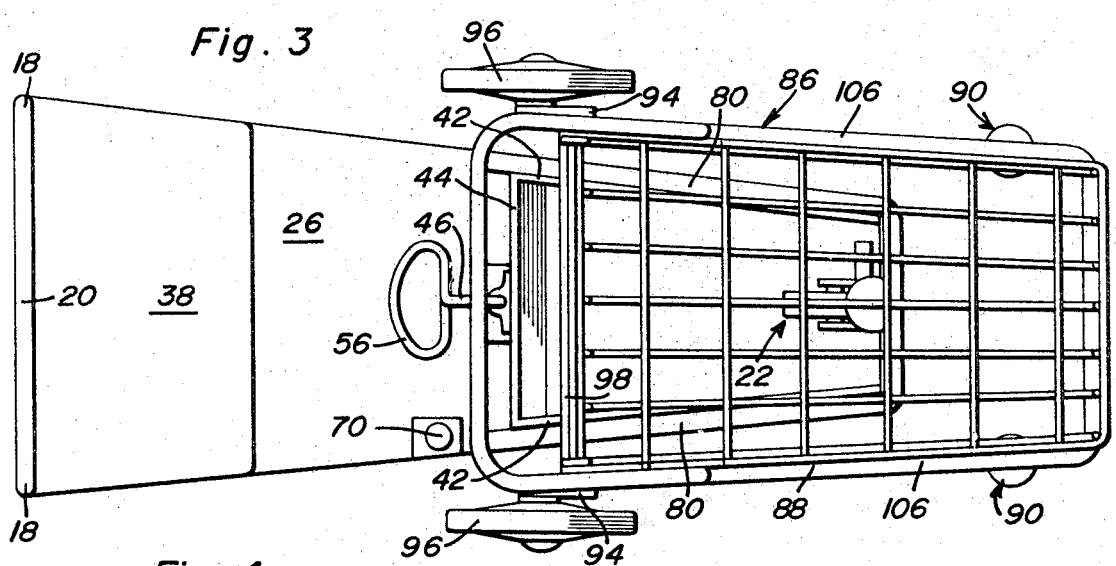
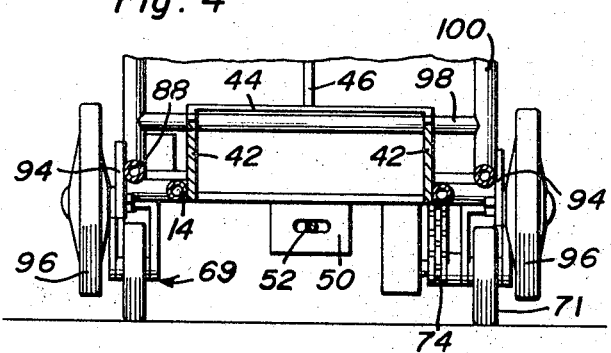

United States Patent Office 3,524,512
Patented Aug. 18, 1970

3,524,512
SELF-PROPELLED DRIVING AND STEERING
TRUCK FOR SHOPPING CARTS
Elton L. Voeks, P.O. Box 97, and Arwed J. Barnowsky,
R.R., both of Baileys Harbor, Wis. 54202
Filed Feb. 21, 1968, Ser. No. 707,179
Int. Cl. B60d *3/00;* B62d *63/00*
U.S. Cl. 180—14                                5 Claims

ABSTRACT OF THE DISCLOSURE

A self-propelled truck including a rear operator's position and front steerable wheel means, the cart including a forward portion adapted to be disposed beneath and to support the rear portion of a shopping cart with the rear wheels of the shopping cart in at least slightly elevated position above the ground whereby the self-propelled truck may be utilized to propel and steer the shopping cart.

---

This invention relates generally to a self-propelled driving and steering truck for shopping carts of the type found in grocery supermarkets and department stores. More specifically, it relates to a power operated device including seat means upon which one or more persons may ride and designed for detachable connection to a shopping cart normally intended for manual operation whereby the truck may be utilized to support a shopper and to propel a shopper and his or her shopping cart around and through the aisles of a supermarket.

The invention is so designed that any person of average intelligence can connect it to or detach it from a shopping cart and do so without making complicated fastenings of mechanical brackets or the like.

The forward portion of the truck is adapted to be wedged forwardly beneath the rear of a shopping cart and includes cam or ramp surfaces operable to upwardly displace the rear end of the associated shopping cart so as to lift the rear wheels thereof off of the floor. The truck further includes means whereby a portion of the rear of the associated shopping cart will automatically drop into upwardly opening recesses defined by the truck upon movement of the forward portion thereof beneath the associated shopping cart to raise the rear end of the latter off of the floor. The upwardly opening recesses are adapted to receive predetermined portions of the cart in a manner such that the rear of the shopping cart will be supported from and connected to the forward portion of the truck in a manner such that the truck may be utilized to propel and steer the cart through an associated supermarket. The front wheels of conventional shopping carts are of the castor type where as the rear wheels of shopping carts are journalled for rotation about fixed transverse axes. Accordingly, when the rear end of the associated shopping cart is lifted clear of the floor and supported from a forward portion of the truck, steerage of the forward end of the truck will also effect steerage of the shopping cart.

The main object of this invention is to provide a power operated device which may be quickly and conveniently attached to a manually propelled shopping cart in such a manner that the combination of the power operated device and the cart forms a vehicle which may be readily steered and controlled by a riding attendant.

Another object of this invention is to provide a power operated device in accordance with the immediately preceding object including electric motor means as its power source and provided with storage batteries to operate the electric motor means and which may be readily recharged during the evening hours when the supermarket is closed or during non-use.

Yet another object of this invention is to provide a device in accordance with the preceding objects constructed in a manner such that it may be readily operatively connected to an associated shopping cart.

A further object of this invention is to provide an apparatus which may be readily controlled and operated efficiently by substantially all persons who might be customers in a supermarket.

A further object of this invention is to provide a self-propelled driving and steering truck for shopping carts constructed in a manner such that it may be readily utilized in conjunction with various type of shopping carts.

A final object of this invention to be specifically enumerated herein is to provide a device in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is a side elevational view of the driving and steering truck operatively associated with a shopping cart with the rear end of the latter elevated above the floor and supported from the forward end of the truck;

FIG. 3 is a top plan view of the assemblage illustrated in FIG. 2;

FIG. 4 is a fragmentary transverse vertical sectional view taken substantially upon the plane indicated by the section line 4—4 of FIG. 2.

Figure 1:
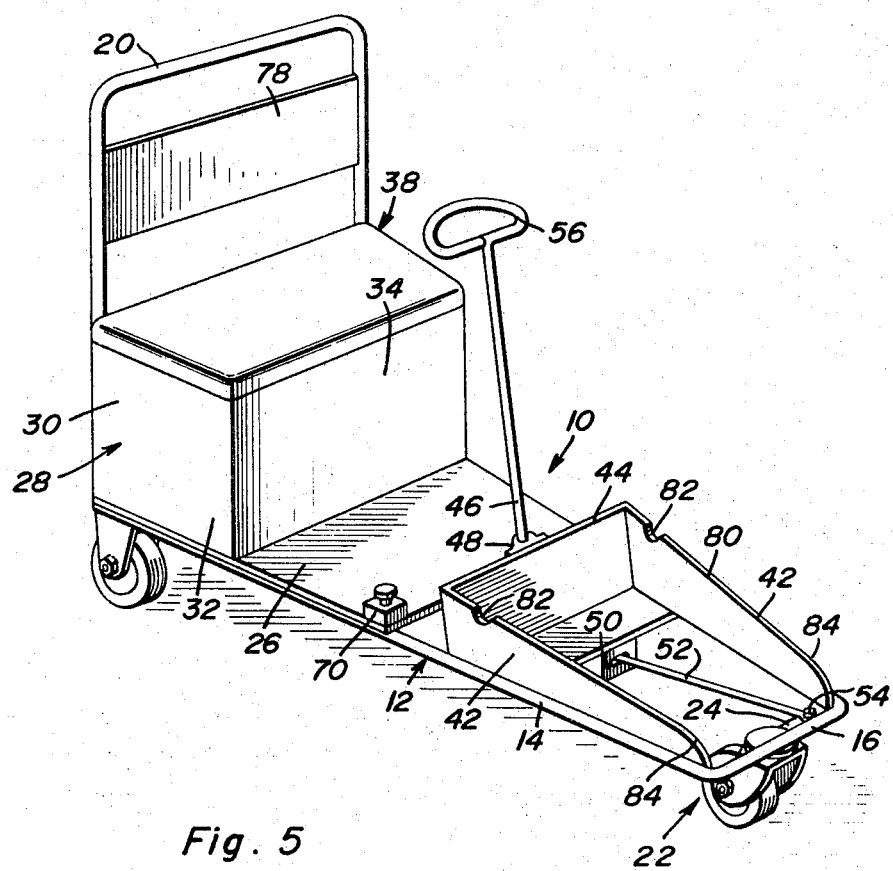
FIG. 1 is a perspective view of the self-propelled driving and steering truck of the instant invention.
Figure 5:
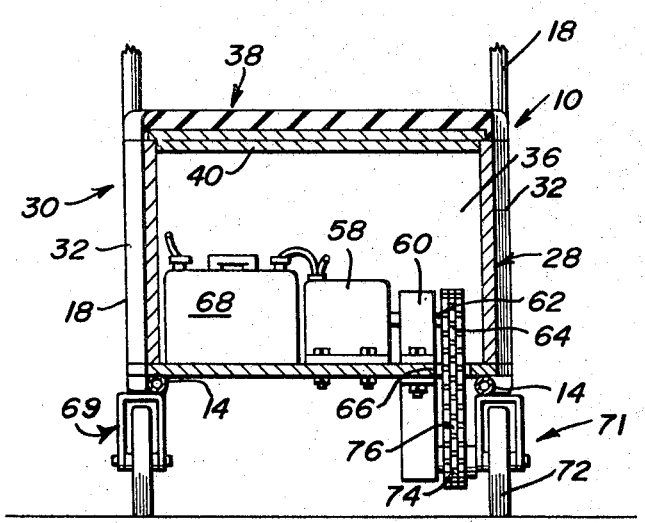
FIG. 5 is a fragmentary vertical transverse sectional view taken substantially upon the plane indicated by section line 5—5 of FIG. 2.

Referring now more specifically to the drawings the numeral 10 generally designates the self-propelled driving and steering truck of the instant invention. The truck 10 includes a main frame referred to in general by the reference numeral 12 consisting of a pair of generally horizontal and forwardly convergent tubular opposite side members 14 interconnected at their forward ends by means of an integral forward transverse tubular member 16. The rear ends of the opposite side members 14 terminate in upwardly directed opposite side and integral upstanding members 18 which are in turn interconnected at the upper ends by means of an upper transverse member 20 which is also tubular and formed integrally with the upstanding members 18.

A forward single dirigible wheel assembly referred to in general by the reference numeral 22 is supported from a front transverse member 16 and includes a horizontally directed steering arm 24. The rear end of the frame 12 is covered by a platform 26 secured over the rear end portion of the side members 14 in any convenient manner and a seat structure referred to in general by the reference numeral 28 is supported from and secured to the rear end of the platform 26. The seat structure 28 includes a hollow housing 30 including opposite side walls 32 and front and rear walls 34 and 36. A cushioned seat referred to in general by the reference numeral 38 is supported from and is secured to the top of the housing 30 and includes a downwardly projecting portion 40 which is snugly receivable downwardly into the open upper end of the housing 30. The cushioned seat 38 is readily removable to provide access to the interior of the housing and any suitable means (not shown) may be utilized to secure the cushioned seat 38 to the top of the housing 30 against the removal of the cushion seat 38 by curious persons or children.

The forward end portion of the truck 10 includes a pair of opposite side cam or wedge boards 42 resting on and supported from the forward end portions of the side members 14. The rear ends of the cam or wedge boards 42 are interconnected by means of an upstanding panel 44 and the lower end of a steering shaft 46 is journalled from the panel 44 as at 48.

A steering box 50 is supported in depending fashion from the frame 12 and the lower end of the steering shaft 46 passes into the steering box 50 to reciprocably drive a steering rod 52 projecting forwardly out of the steering box 50 and pivotally connected to the free end of the steering arm 24 at its forward end as at 54. The steering rod is reciprocal in response to rotation of the steering shaft 46 and the upper end of the latter includes a horizontally disposed handgrip portion 56 adapted to be manually grasped by a person seated on the covered seat 38.

The platform 26 forms a bottom for the housing 30 and supports thereon an electric motor 58 and a gear reduction drive assembly 60 driven by the electric motor 58 and including an output shaft 62 having a sprocket wheel 64 mounted thereon. The platform 26 includes an opening 66 beneath the sprocket wheel 64 and a conventional and rechargeable storage battery 68 is also disposed within the housing 30 and is electrically connected to the motor 58 through a suitable control assembly 70 mounted on the forward right-hand corner portion of the platform 26 to the right of the lower end of the steering shaft 46.

The right rear corner of the frame 12 includes a depending wheel assembly referred to in general by the reference numeral 69 and the left rear corner of the frame 12 includes a depending wheel assembly 71 including a wheel 72 with which a second sprocket wheel 74 is drivingly connected, an endless chain 76 being entrained about the sprocket wheels 64 and 74 and extending through the opening 66 in the platform 26.

The uprights 18 define a seat back portion for the covered seat 38 and an upstanding panel 78 is secured between the uprights 18 adjacent but spaced below their upper ends.

The cam or wedge boards 42 include forwardly and downwardly inclined upper edges 80 having upwardly opening recesses 82 in their upper ends and the forward lower ends of the edges 80 terminate in downwardly curving forward end portions 84.

A conventional shopping cart is referred to in general by the reference numeral 86 includes a lower horizontal frame portion 88 from which a pair of forward depending caster assemblies generally referred to by the reference numeral 90 are supported. The rear end of the frame portion 88 terminates in an outwardly directed rear upstanding portion 92 and a pair of depending and rearwardly projecting brackets 92 are supported from the cart 86 at the intersections between the upstanding portion 92 and the opposite sides of the frame portion 88. A pair of rear wheels 96 are journalled from the brackets 94 and a rear lower horizontal brace 98 extends between opposite side uprights 100 of the upstanding portion 92. The brace 98, when the rear wheels 96 are on the floor 104 from which the truck 10 and cart 90 are supported, is disposed at an elevation generally horizontally aligned with or slightly elevated above the forward lower ends of the edges 80 where they merge into downwardly curving forward end portions or edges 84. Thus, the cart 86 may be rearwardly advanced toward the forward end of the truck 10 so as to engage the brace 98 with the lower ends of the edges 80 in order to cam or wedge the rear end of the cart 86 upwardly and lift its rear wheels 96 from the floor 104. The brace 98 includes opposite end portions disposed inwardly of the opposite side members 106 of the frame portion 88 and which are snugly and oscillatably receivable in the recesses and the rear end of the cart 86 may therefore be removably supported from the forward end of the truck 10. Of course, after the cart 86 has been shifted into position such as that illustrated in FIG. 2 of the drawings with the rear wheels 96 thereof elevated above the floor 104 and the brace 98 seatingly received in the recesses 82, a person may assume a seated position on the covered seat 38 of the truck 10 and operate the latter to propel and steer the cart 86 over the floor 104.

After a shopper has finished using the truck 10, the cart 86 may be lifted at its rear end and moved forwardly relative to the truck 10 so as to disengage the cart 86 from the truck. Thereafter, the cart 86 may be stored in the conventional manner in nested relation relative to other carts and the next customer may removably support his cart from the forward end of the truck 10.

It may be observed that the control assembly or switch 70 of the truck 10 is floor mounted and therefore a child seated within the conventional shopping cart 86 may not reach the control assembly 70 for actuation thereof. In addition, if the conventional shopping cart 86 is not provided with a brace, such as brace 98, a suitable substitute therefor may be clamped or otherwise secured to the shopping cart 86.

The foregoing is considered as illustrative only of the principles of the invention. Further, since numerous modification and changes will readily occur to those skilled in art, it is not desired to limit the invention to the exact construction and operation shown and described, and accordingly all suitable modifications and equivalents may be resorted to, falling within the scope of the invention as claimed.

What is claimed as new is as follows:

1. In combination with a cart having front and rear ends provided with front and rear supporting wheel means, respectively, and wherein said front wheel means comprise caster wheel means, a truck also having front and rear ends and front and rear supporting wheel means, said cart rear wheel means including opposite side rear wheels, said truck front end being low and receivable beneath the rear end of the cart between the opposite side rear wheels thereof, said cart rear end including opposite side follower portions incuding downwardly facing follower surfaces disposed inwardly of said rear wheels and said truck front end including opposite side cam members defining rearwardly and upwardly inclined cam surfaces engageable with said follower surfaces to cam the rear end of said cart upwardly in response to forward advancement of the forward end of said truck beneath the rear end of said cart, the upper rear end portions of said cam surfaces including retaining means with which said follower portions are engageable to releasably retain said cart against longitudinal shifting and angular displacement about an upstanding axis relative to said truck, said truck including motor means drivingly connected to one of said rear wheels, steering control means movably supported from said truck rearward of and in elevated position relative to said cam surfaces, and connecting means operatively connecting said control means to said front wheel means for steering the latter in response to movement of said control means, said connecting means extending forwardly from a lower portion of said control means toward and for connection with said front wheel means at a level below said cam surfaces.

2. The combination of claim 1 wherein said steering control means include an upstanding shaft journaled at its lower end from said truck rearwardly of said cam surfaces and an upper hand grip portion on the upper end of said shaft, a lateral steering arm mounted on said front wheel means for oscillation therewith, said connecting means including an elongated steering rod extending longitudinally of said truck having its forward end pivotally secured to said steering arm and means operatively connecting the lower end of said shaft to the rear end of said rod for reciprocating the latter in response to oscillation of the former.

3. The combination of claim 2 wherein the rear end of said truck includes a seat spaced rearwardly of said hand grip portion.

4. The combination of claim 2 wherein said retaining means includes upwardly opening recesses formed in said cam members adjacent the upper ends of said cam surfaces in which said cam followers are seatingly engageable.

5. The combination of claim 4 wherein said cam followers comprise opposite end portions of a lower rear transverse member of said cart.

References Cited
UNITED STATES PATENTS

| | | | |
|---|---|---|---|
| 2,931,450 | 4/1960 | Bear | 180—25 X |
| 3,015,494 | 1/1962 | Fosbrook | 280—33.99 |
| 3,044,801 | 7/1962 | Vicany | 280—33.99 X |
| 3,073,404 | 1/1963 | Hudson | 180—27 |
| 3,157,871 | 11/1964 | Umanoff | 280—33.99 X |
| 3,273,661 | 9/1966 | Shannon | 180—27 |
| 3,375,018 | 3/1968 | Close | 280—33.99 |

A. HARRY LEVY, Primary Examiner

U.S. Cl. X.R.

280—33.99; 180—25